US010095306B2

(12) United States Patent
Welti

(10) Patent No.: US 10,095,306 B2
(45) Date of Patent: Oct. 9, 2018

(54) PASSIVE MAGNETIC HEAD TRACKER

(71) Applicant: HARMAN INTERNATIONAL INDUSTRIES, INC., Stamford, CT (US)

(72) Inventor: Todd S. Welti, Thousand Oaks, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 14/739,995

(22) Filed: Jun. 15, 2015

(65) Prior Publication Data
US 2016/0363992 A1 Dec. 15, 2016

(51) Int. Cl.
G09G 1/14 (2006.01)
G06F 3/01 (2006.01)
G02B 27/01 (2006.01)
G06F 3/0346 (2013.01)

(52) U.S. Cl.
CPC .......... *G06F 3/012* (2013.01); *G02B 27/017* (2013.01); *G06F 3/014* (2013.01); *G06F 3/0346* (2013.01); *G02B 2027/0187* (2013.01)

(58) Field of Classification Search
CPC .......................... G01B 21/16; G02B 27/0093; H04R 2499/13; G06F 17/00; G06F 3/012; H04S 7/304
See application file for complete search history.

(56) References Cited

U.S. PATENT DOCUMENTS

| | | | | |
|---|---|---|---|---|
| 5,812,257 A | * | 9/1998 | Teitel | G01S 7/06 342/463 |
| 2009/0147993 A1 | | 6/2009 | Hoffmann et al. | |
| 2010/0009752 A1 | * | 1/2010 | Rubin | A63F 13/06 463/36 |
| 2013/0191068 A1 | * | 7/2013 | Hess | G01B 21/16 702/141 |
| 2014/0062842 A1 | * | 3/2014 | Tachibana | H04M 1/6058 345/8 |
| 2014/0254817 A1 | * | 9/2014 | Vilermo | H04R 1/32 381/74 |
| 2016/0033768 A1 | * | 2/2016 | Pedrotti | G02B 27/0149 345/8 |
| 2016/0123758 A1 | * | 5/2016 | Benzaia | H04N 7/185 701/538 |

* cited by examiner

Primary Examiner — Nelson Rosario
(74) Attorney, Agent, or Firm — Artegis Law Group, LLP

(57) ABSTRACT

A wearable device worn on the head of a user determines the head orientation of the user. A tracking application executing on the wearable device determines the orientation of the wearable device relative to a frame of reference. A mobile application executing on a mobile device likewise determines the orientation of the mobile device relative to the frame of reference. The frame of reference may be magnetic north or an inertial reference frame shared between the wearable device and the mobile device. The tracking application estimates the head orientation of the user, relative to the mobile device, based on the relative orientations of the wearable device and the mobile device.

23 Claims, 10 Drawing Sheets

PASSIVE MAGNETIC HEAD TRACKER

BACKGROUND

Field of the Disclosed Embodiments

The disclosed embodiments relate generally to wearable devices and, more specifically, to a passive magnetic head tracker.

Description of the Related Art

Reliably determining the head orientation of a user is a common objective in a variety of different contexts. For example, the head orientation of a user may be valuable for identifying the direction the user is looking or for identifying a specific object on which the user is focused. Head orientation may also be important in the context of virtual reality (VR) or augmented reality (AR). For example, a VR device could output audiovisual data to the user that reflects a virtual world, and then modify that audiovisual data, based on the head orientation of the user, to cause that virtual world to appear more realistic to the user. In a specific example, if the user were to turn his/her head in a particular direction, then the VR device could pan the virtual world in the same direction. The VR device could also modify audio that is output to the user to reflect the change in head position. This technique would preserve the immersion of the user in the virtual world.

A conventional approach to head tracking involves outfitting the user with a head tracking device that detects motion. The detected motion is then assumed to reflect changes in head orientation. However, this approach suffers from a variety of drawbacks. First, the detected head motion does not necessarily reflect a change in head orientation. For example, if the user were to ride in a car that is turning towards the right, then the head tracker could erroneously interpret this motion to mean that the user has turned his/her head to the right. Second, systems that depend on motion detection generally suffer from drift issues. Drift introduces errors that, over time, can substantially reduce the accuracy with which head orientation can be determined. Finally, motion-based head trackers generally include complex mechanical hardware. Such hardware is often bulky, is not mechanically robust, and typically requires excessive power to operate.

As the foregoing illustrates, more effective techniques for tracking the head position of a user would be useful.

SUMMARY

One or more embodiments set forth include a computer-implemented method for determining a head orientation of a user, including determining a first orientation of a first device relative to a shared reference frame, where the first device is associated with the head of the user, determining a second orientation of a second device relative to the shared reference frame, where the second device is associated with the body of the user, and comparing the first orientation to the second orientation to determine a relative orientation between the first device and the second device, where the relative orientation reflects the head orientation of the user.

At least one advantage of the disclosed embodiments is that the head orientation of the user may be determined using passive components, without substantial reliance on power-hungry active components.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the invention subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

System Overview

Figure 1:
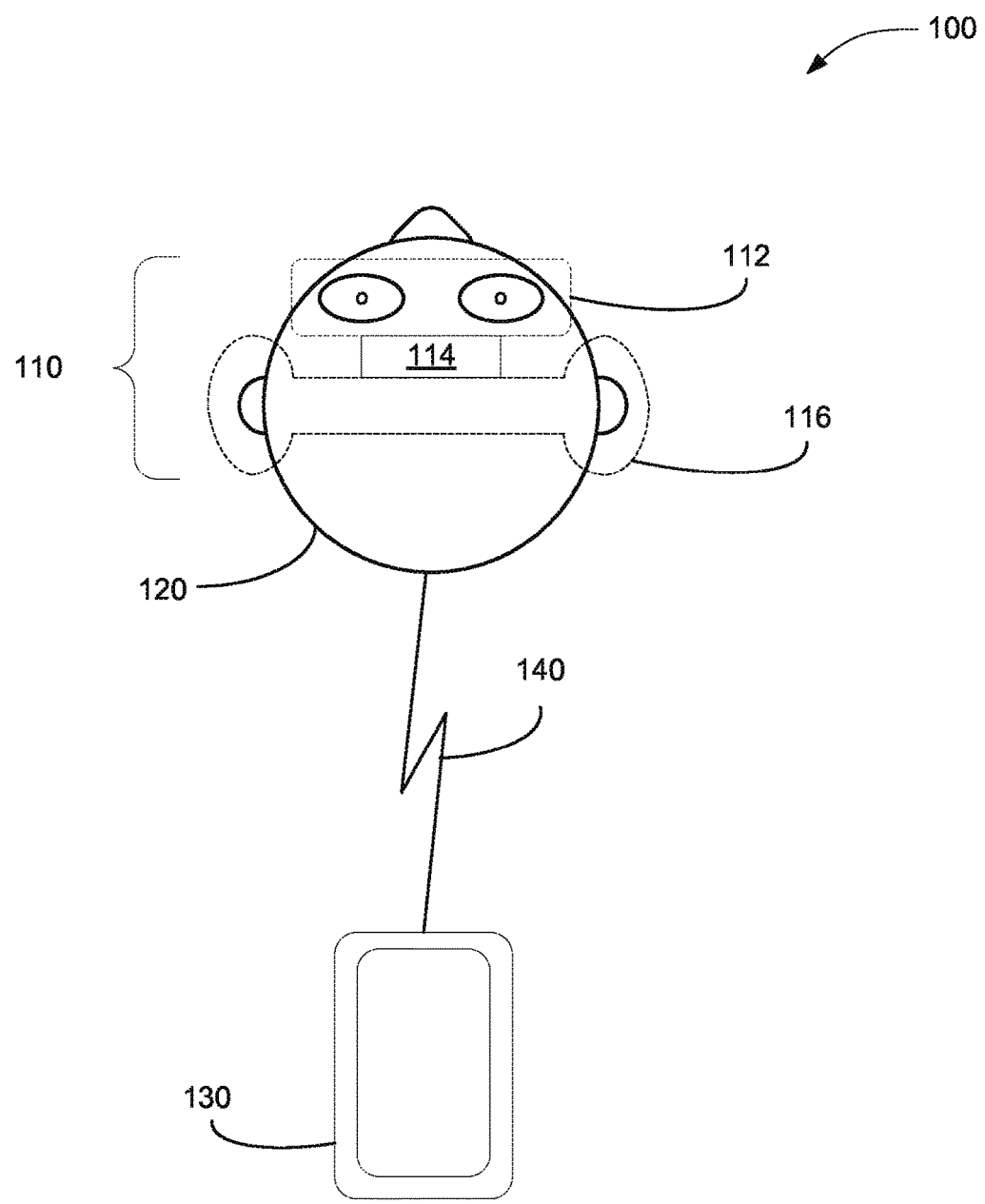
FIG. 1 illustrates a system configured to implement one or more aspects of the various embodiments.

FIG. 1 illustrates a system configured to implement one or more aspects of the various embodiments. As shown, a system 100 includes a wearable device 110 configured to be worn on the head of a user 120. Wearable device 110 is coupled to a mobile device 130 via data connection 140. Data connection 140 may be any technically feasible form of wireless or wired coupling that is configured to transport data. Wearable device 110 includes an optical device 112, a computing device 114, and an audio device 116. Wearable device 110 is configured to interoperate with mobile device 130 in order to determine the head orientation of user 120 relative to the orientation of mobile device 130. In doing so, wearable device 110 determines the orientation of wearable device 110 relative to magnetic north. In like fashion, mobile device 130 determines the orientation of mobile device 140 relative to magnetic north. By comparing these two orientations, the head orientation of user 120 may be determined.

Various techniques for performing these operations are described in greater detail below in conjunction with FIGS. 4-9.

In various embodiments, wearable device 110 may represent a virtual reality device or an augmented reality device. In such embodiments, computing device 114 may generate audiovisual data that represents a virtual world. Computing device 114 may cause optical device 112 to output visual data to the user that reflects this virtual world. Likewise, computing device 114 may cause audio device 116 to output audio data that similarly represents the virtual world. The aforesaid audiovisual data may characterize an immersive virtual world that is meant to induce a virtual experience of reality. Alternatively, this audiovisual data may represent augmentations to the real world, meant to enhance the perception of reality in a non-immersive fashion. Computing device 114 may adjust the audiovisual data that is output to user 120 based on the head orientation of user 120. For example, and without limitation, if the head of user 120 turns towards a specific direction, then computing device 114 may correspondingly pan the audiovisual data towards that direction, potentially increasing the realism of the virtual or augmented reality presented to user 120. Wearable device 110 may be configured to determine the head orientation of user 120 in order to support the functionality described above.

In other embodiments, either optical device 112 or audio device 116 may be omitted from wearable device 110. For example, and without limitation, wearable device 110 could represent a set of headphones configured to modulate audio output based on the head orientation of user, and optical device 112 would be omitted from wearable device 110. In yet other embodiments, wearable device 110 may represent a device that is dedicated to tracking the head orientation of user 120. In such embodiments, optical device 112 and audio device 116 may be omitted. In any of the embodiments discussed thus far, wearable device 110 and mobile device 130 are configured to interoperate to determine the head orientation of user 120. Wearable device 110 and mobile device 130 are described in greater detail below in conjunction with FIGS. 2 and 3, respectively.

Figure 2:
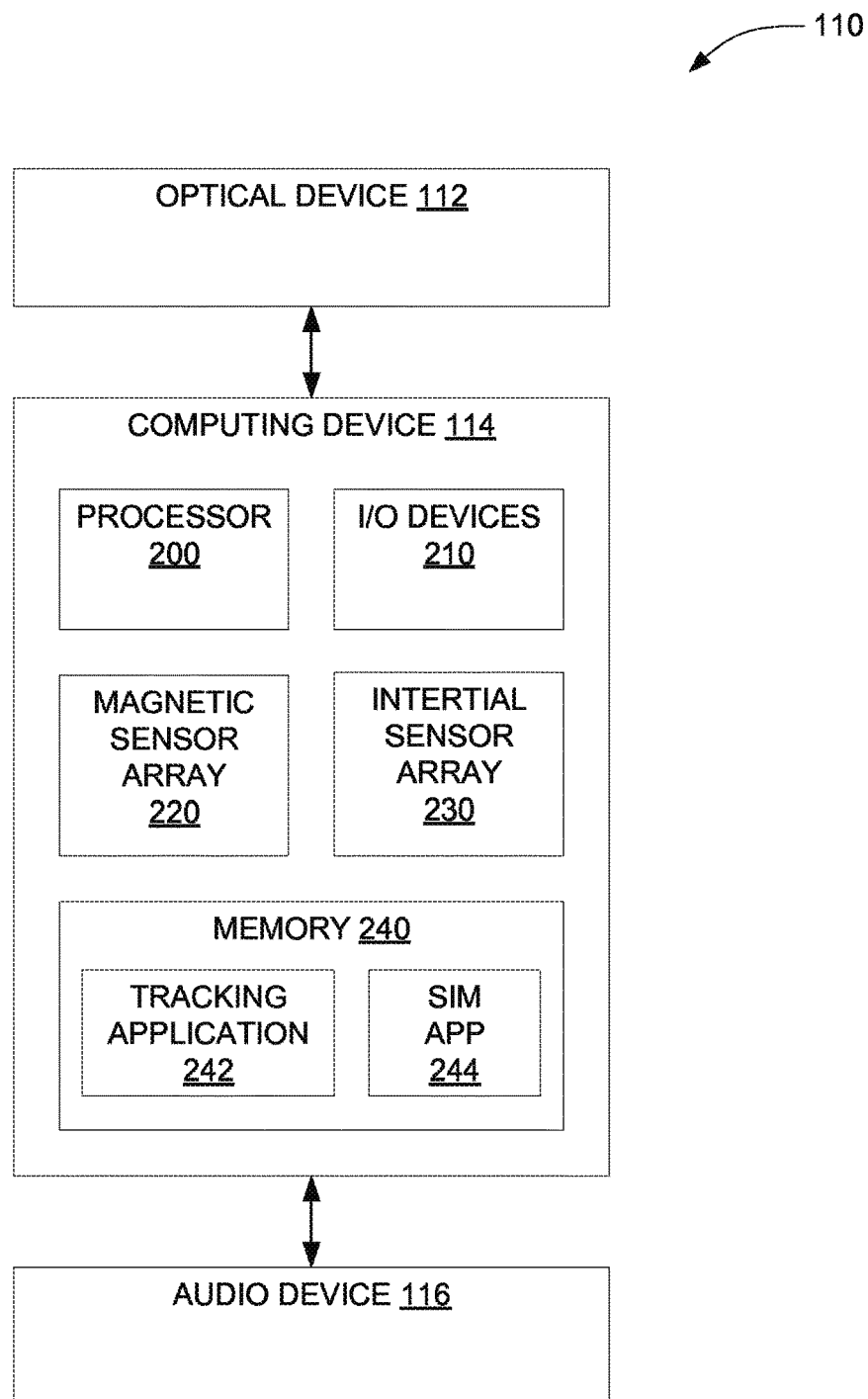
FIG. 2 is a block diagram of the wearable device of FIG. 1, according to various embodiments.

FIG. 2 is a block diagram of the wearable device of FIG. 1, according to various embodiments. As shown, wearable device 110 includes optical device 112 coupled to computing device 114, which, in turn, is coupled to audio device 116. Optical device 112 generally includes one or more video outputs. For example, and without limitation, optical device 112 could include binocular video outputs that present slightly different visual images to user 120, thereby causing user 120 to experience the perception of three-dimensional (3D) images. Optical device 112 may one or more liquid crystal display (LCD) screens or any other technically feasible hardware for generating optical signals. Audio device 116 generally includes one or more audio outputs. For example, and without limitation, audio device 116 could include stereo audio outputs meant to output different audio channels, thereby causing user 120 to experience the perception of 3D sound. Audio device 116 may include multiple speakers, transducers, or any other technically feasible hardware for generating audio signals. Computing device 114 is configured to generate visual data for output by optical device 112 and generate audio data for output by audio device 116. In doing so, computing device 114 may cause user 120 to experience a virtual or augmented reality.

Computing device 114 includes a processor 200, input/output (I/O) devices 210, a magnetic sensor array 220, an inertial sensor array 230, and a memory 240. Memory 240 includes a tracking application 242 and a simulation application 244. Processor 200 may be any technically feasible hardware unit configured to process data and execute software applications, including, for example, and without limitation, a central processing unit (CPU), microcontroller, application specific integrated circuit (ASIC), and so forth. I/O devices 210 may include devices configured to receive input, devices configured to produce output, as well as devices capable of both receiving input and producing output.

Magnetic sensor array 220 is a passive device configured to detect magnetic fields and, in response, generate magnetic orientation data. The magnetic orientation data reflects the direction of magnetic north in a 3D coordinate frame relative to wearable device 110. Magnetic sensor array 220 could include, for example, and without limitation, a magnetometer, a Hall effect sensor, a magneto-diode, a magneto-transistor, a magneto-optical sensor, a microelectromechanical (MEMS) compass, and so forth. Inertial sensor array 230 is an active device configured to generate inertial orientation data. The inertial orientation data reflects motion and rotation of wearable device 110 relative to an inertial reference frame, and may indicate the position and orientation of wearable device 110 relative to that reference frame. In one embodiment, inertial sensor array 230 represents a portion of an inertial guidance system, and may thus include one or more accelerometers and one or more gyroscopes.

Memory 240 is a storage medium configured to store data and software applications, such as tracking application 242 and simulation application 244 mentioned above. When executed by processor 200, tracking application 242 may determine the orientation of wearable device 110 relative to mobile device 130. In one embodiment, tracking application 242 then outputs the head orientation of user 120 to simulation application 244. Simulation application 244 may be a video game, virtual reality program, or another type of application that generates and/or modifies a simulated environment based on the head orientation of user 120. For example, simulation application 244 may output an immersive visual scene to user 120 that changes based on the head orientation of user 120. Simulation application 244 is provided for exemplary purposes only, and in some embodiments may be omitted.

Prior to determining the head orientation of user 120, tracking application 240 may perform a calibration routine with magnetic sensor array 220 to establish magnetic north and/or perform a calibration routing with inertial sensor array 230 to establish an inertial reference frame. In one embodiment, tracking application 242 may acquire orientation data from magnetic sensor array 220 and/or inertial sensor array 230, as well as orientation data from mobile device 130. Tracking application 242 may compute, based on the acquired data, the orientation of wearable device 110 relative to mobile device 130. In an alternative embodiment, tracking application 242 may transmit to mobile device 130 orientation data received from magnetic sensor array 220 and/or inertial sensor array 230. In response to receiving this data, mobile device 130 may then compute the orientation of wearable device 110 relative to mobile device 130. Mobile device 130 is described in greater detail below in conjunction with FIG. 3.

In one embodiment, tracking application 242 outputs the head orientation of user 120 to simulation application 244. Simulation application 244 may be a video game, virtual reality program, or another type of application that generates and/or modifies a simulated environment based on the head orientation of user 120. For example, simulation application 244 may output an immersive visual scene to user 120 that changes based on the head orientation of user 120.

Figure 3:
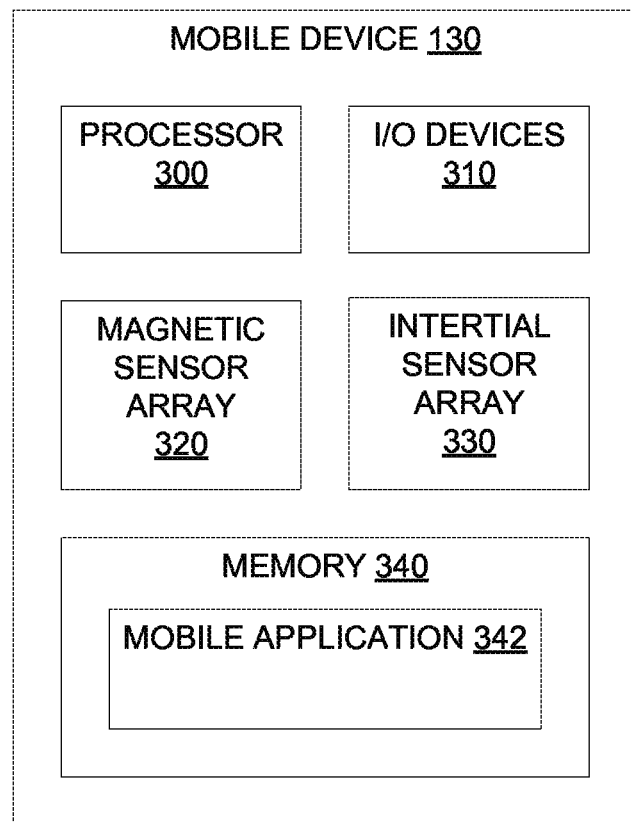
FIG. 3 is a block diagram of the mobile device of FIG. 1, according to various embodiments.

FIG. 3 is a block diagram of the mobile device of FIG. 1, according to various embodiments. Mobile device 130 may be any form of computing device, including, without limitation, a laptop computer, a tablet computer, a smartphone, and so forth. As shown, mobile device 130 includes a processor 300, I/O devices 310, a magnetic sensor array 320, an inertial sensor array 330, and a memory 340. Memory 340 includes a tracking application 342. Processor 300 may be any technically feasible hardware unit configured to process data and execute software applications, including, for example, and without limitation, a CPU, microcontroller, ASIC, and so forth. I/O devices 310 may include devices configured to receive input, devices configured to produce output, as well as devices capable of both receiving input and producing output.

Magnetic sensor array 320 is a passive device configured detect magnetic fields and, in response, to generate magnetic orientation data. The magnetic orientation data reflects the direction of magnetic north in a 3D coordinate frame relative to mobile device 130. Magnetic sensor array 320 could include, for example, and without limitation, a magnetometer, a Hall effect sensor, a magneto-diode, a magneto-transistor, a magneto-optical sensor, a MEMS compass, and so forth. Inertial sensor array 330 is an active device configured to generate inertial orientation data. The inertial orientation data reflects motion and rotation of mobile device 130 relative to an inertial reference frame, and may indicate the position and orientation of mobile device 130 relative to that reference frame. In one embodiment, inertial sensor array 330 represents a portion of an inertial guidance system, and may thus include one or more accelerometers and one or more gyroscopes.

Memory 340 is a storage medium configured to store data and software applications, such as mobile application 342 mentioned above. Mobile application 342, when executed by processor 300, interoperates with tracking application 242 shown in FIG. 2 to determine the orientation of wearable device 110 relative to mobile device 130. In doing so, mobile application 340 may perform a calibration routine with magnetic sensor array 320 to establish magnetic north and/or perform a calibration routing with inertial sensor array 330 to establish an inertial reference frame. In one embodiment, mobile application 342 may acquire orientation data from magnetic sensor array 320 and/or inertial sensor array 330, and provide that data to tracking application 242. As discussed above in conjunction with FIG. 2, tracking application 242 may then compute the orientation of wearable device 110 relative to mobile device 130. In an alternative embodiment, mobile application 342 may receive orientation data from tracking application 242, and then compute the orientation of wearable device 110 relative to mobile device 130. Mobile application 342 may then transmit data that reflects the orientation of wearable device 110 relative to mobile device 130 back to wearable device 110.

Figure 4A:
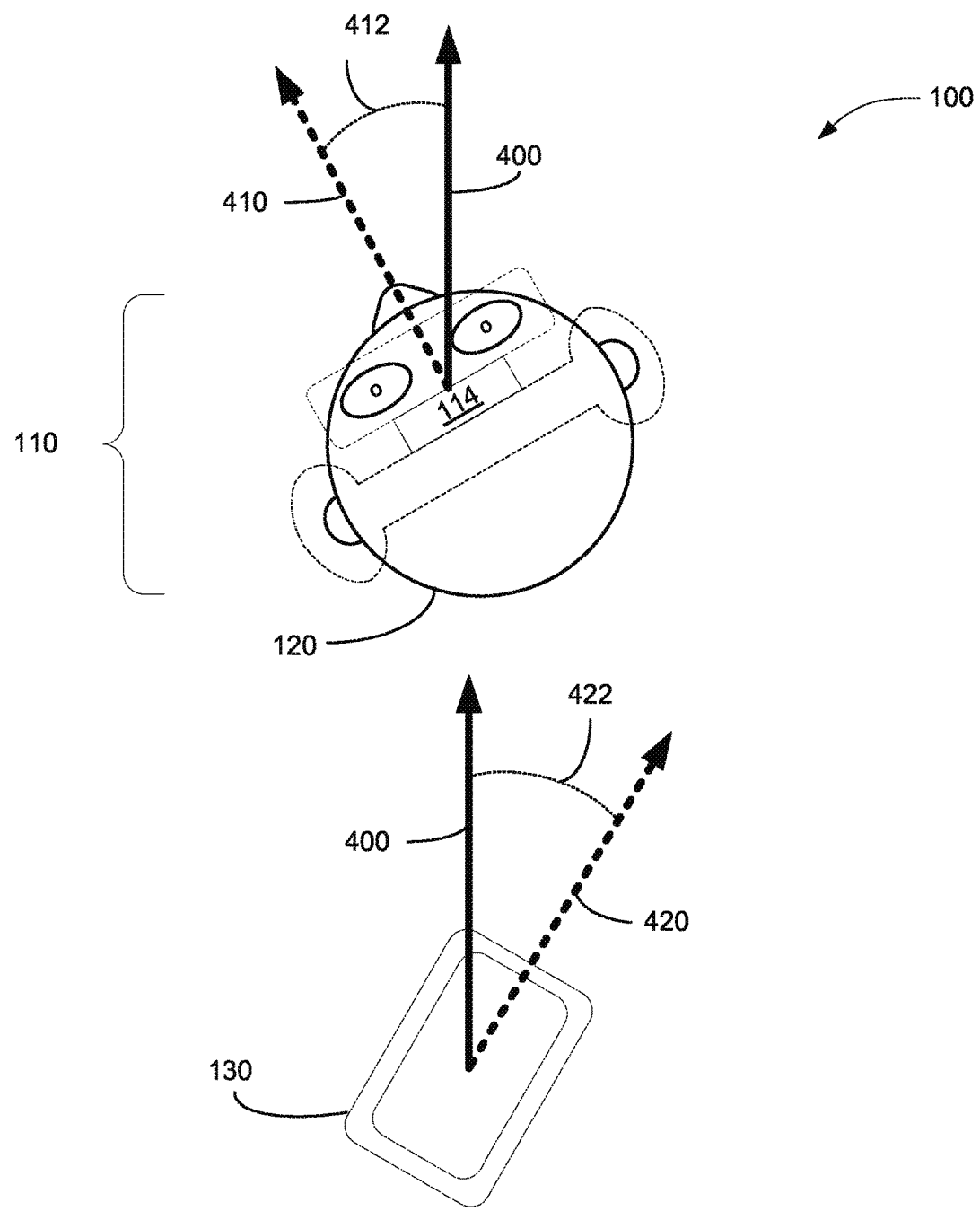
FIGS. 4A-4B are conceptual diagrams illustrating a technique for determining the head orientation of a user, according to various embodiments.
Figure 4B:
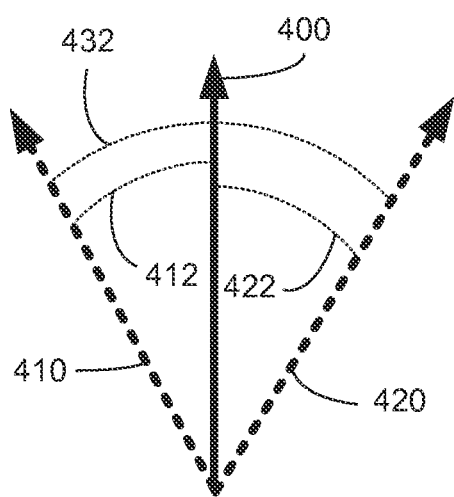

Referring generally to FIGS. 2-3, the specific implementations of wearable device 110 and mobile device 130 shown in these figures are provided for exemplary purposes only and not meant to limit the scope of the invention. Persons skilled in the art will recognize that a wide variety of other devices may be configured to perform the functionality of wearable device 110 and mobile device 130, beyond those depicted in FIGS. 2-3. FIGS. 4A-4B, described below in greater detail, conceptually illustrates an approach for computing the orientation of wearable device 110 relative to mobile device 130.

Techniques for Determining Relative Head Orientation

FIGS. 4A-4B are conceptual diagrams illustrating a technique for determining the head orientation of a user, according to various embodiments. As shown in FIG. 4A, magnetic north 400 is depicted as a vector and is superimposed over computing device 114. As discussed above in conjunction with FIG. 2, wearable device 110 is configured to generate magnetic orientation data that reflects the direction of magnetic north within a 3D coordinate space. Based on this magnetic orientation data, tracking application 242 within computing device 114 determines that the head of user 120 is oriented towards direction 410, thereby forming an angle 412 between magnetic north 400 and direction 410.

As also shown, magnetic north 400 is similarly superimposed over mobile device 130. As discussed above in conjunction with FIG. 3, mobile device 130 is configured to generate magnetic orientation data that reflects the direction of magnetic north 400 within a 3D coordinate space. Based on this magnetic orientation data, mobile application 342 within mobile device 114 determines that mobile device 130 is oriented towards direction 420, thereby forming an angle 422 between magnetic north 400 and direction 410.

Referring now to FIG. 4B, tracking application 242 and mobile application 342 interoperate to determine angle 432 between direction 410 and direction 420. To do so, tracking application 242 and mobile/or mobile application 342 compute the difference between those angles relative to magnetic north 400. Magnetic north 400 generally provides a shared reference for computing that difference. In situations where mobile device 130 is stationary relative to the body of user 120, angle 432 may represent the head orientation of user 120 relative to the body of user 120.

One advantage of the approach outlined above is that directions 410 and 420 can be determined through passive means. Since magnetic sensor arrays 220 and 320 are passive instruments that respond to the magnetic field of the Earth, these instruments consume very little power and do not require complex processing hardware to operate. Accordingly, angles 412 and 422 may be determined with relative ease, and then simply compared with one another to determine the head orientation of user 120. Another advantage is that inertial forces applied to wearable device 110 and mobile device 130 may not disrupt the computation of angles 412 and 422, since those computations depend on the measurement of magnetic north alone. Consequently, angles 412 and 420, and the difference between those angles, may be reliably determined in the presence of outside forces, including the acceleration of an inertial reference frame where user 120 resides.

In one embodiment, the general approach outlined above may also be performed based on inertial orientation data gathered from inertial sensory arrays 230 and 330 instead of, or in addition to, magnetic orientation data gathered from magnetic sensory arrays 220 and 320. In this embodiment, tracking application 242 and mobile application 342 may perform a calibration routine to establish a shared inertial reference frame. For example, and without limitation, each of wearable device 110 and mobile device 130 could simultaneously zero a set of integrators configured to integrate accelerations and rotations of those devices. In this fashion, wearable device 110 and mobile device 130 could establish a common origin for the shared inertial reference frame. Tracking application 242 may track the motion and rotation of wearable device 110 over time relative to the shared reference frame. Likewise, mobile application 342 may track the motion and rotation of mobile device 130 over time relative to the shared reference frame. By comparing the motions and rotations of wearable device 110 and mobile device 130, relative to the shared inertial reference frame, tracking application 242 and/or mobile device 342 may determine the orientation of wearable device 110 relative to the orientation of mobile device 130. Those skilled in the art will recognize that the shared inertial reference frame discussed herein is analogous to magnetic north 400 in the technique described above One advantage of the above technique is that tracking application 232 may determine the head orientation of user 120 along directions that run parallel to the direction of magnetic north 400, including pitch and roll angles of the head of user 120. For example, if user 120 looks upwards (pitch), direction 410 would run parallel to magnetic north 400. In this situation, tracking application 242 and mobile application 242 may not be able to determine the pitch angle of the head of user 120 based on magnetic orientation data alone. However, by relying on inertial orientation data, in the fashion described above, tracking application 242 and mobile application 342 may determine the head orientation of user 120.

Persons skilled in the art will understand that tracking application 242 and mobile application 342 may rely on both magnetic orientation data as well as inertial orientation data in determining the head orientation of user 120, including pitch, roll, and yaw angles. For example, if the head of user 120 turns towards the left (yaw), and also inclines slightly (pitch), tracking application 242 and mobile application 342 may determine the left-turning yaw angle based on magnetic orientation data, and then determine the inclined pitch angle based on inertial orientation data. As a general matter, the various techniques described above may be performed separately or in conjunction with one another to determine the head orientation of user 120. In either case, a flow of data for computing that head orientation is depicted below in conjunction with FIG. 5.

Figure 5:
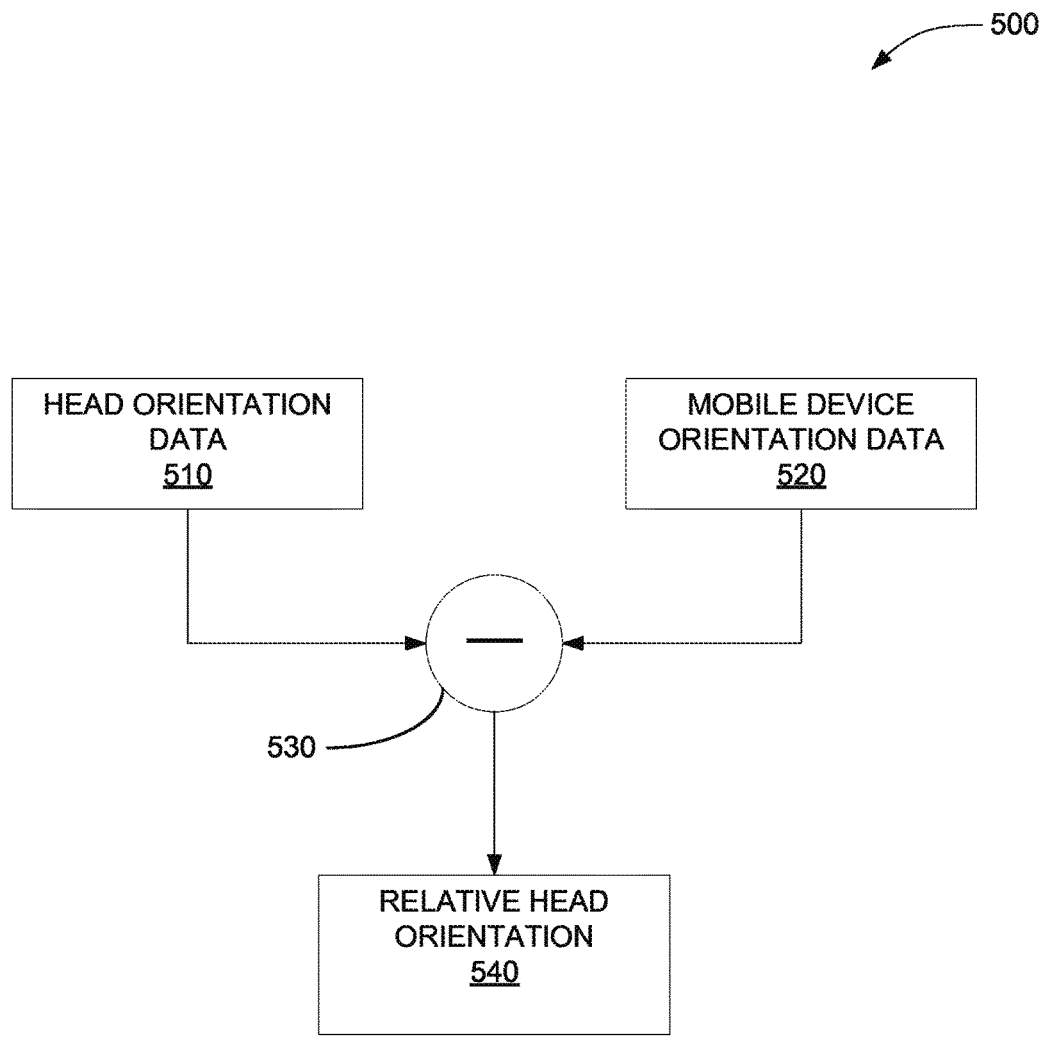
FIG. 5 is a conceptual illustration of data and processing stages that can be implemented to determine the head orientation of a user, according to various embodiments.

FIG. 5 is a conceptual illustration of data and processing stages that can be implemented to determine the head orientation of a user, according to various embodiments. As shown, data flow 500 illustrates head orientation data 510 and mobile device orientation data 520. Head orientation data 510 may reflect magnetic orientation data and/or inertial orientation data provided by magnetic sensor array 220 and/or inertial sensor array 230, respectively. Head orientation data 510 may reflect direction 410 and/or angle 412 shown in FIGS. 4A-4B. Mobile device orientation data 520 may reflect magnetic orientation data provided by magnetic sensor array 320 and/or inertial orientation data provided by inertial sensor array 330, respectively. Mobile device orientation data 520 may reflect direction 420 and/or angle 422 shown in FIGS. 4A-4B. Head orientation data 510 and mobile device orientation data 520 are compared, via comparator 530, to produce relative head orientation 540. In one embodiment, comparator 530 performs a subtraction operation. Relative head orientation 540 may reflect angle 432 shown in FIG. 4B.

Figure 6:
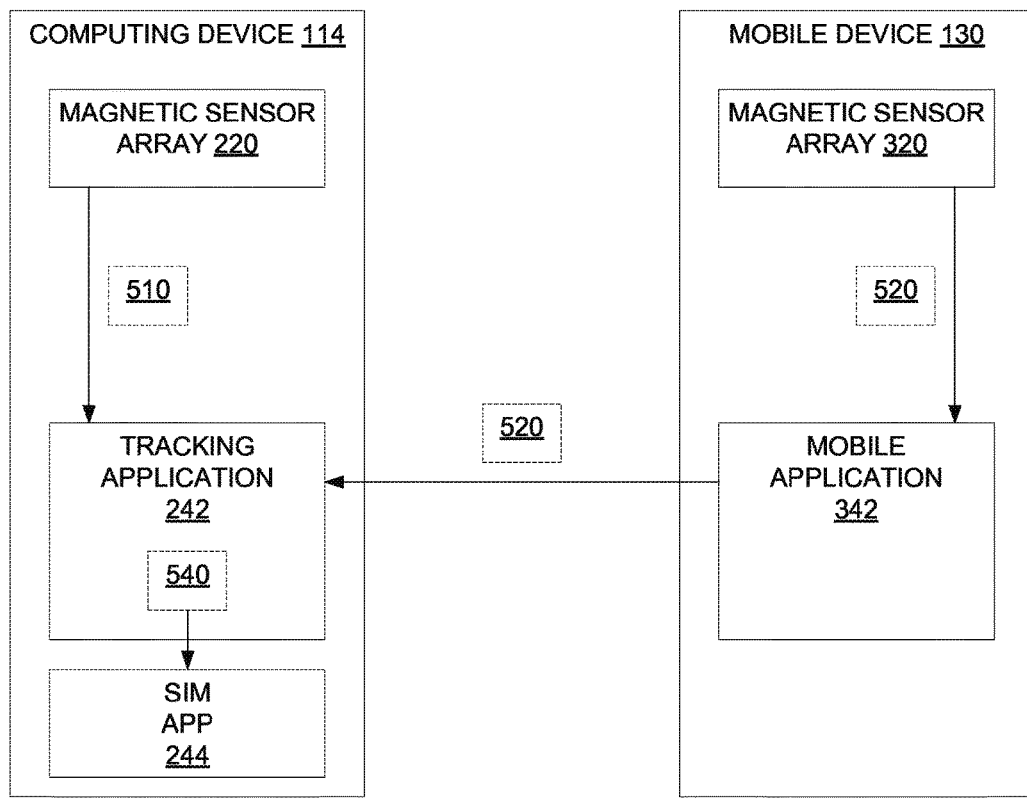
FIG. 6 is a block diagram illustrating one approach to implementing the data and processing stages of FIG. 5, according to various embodiments.
Figure 7:
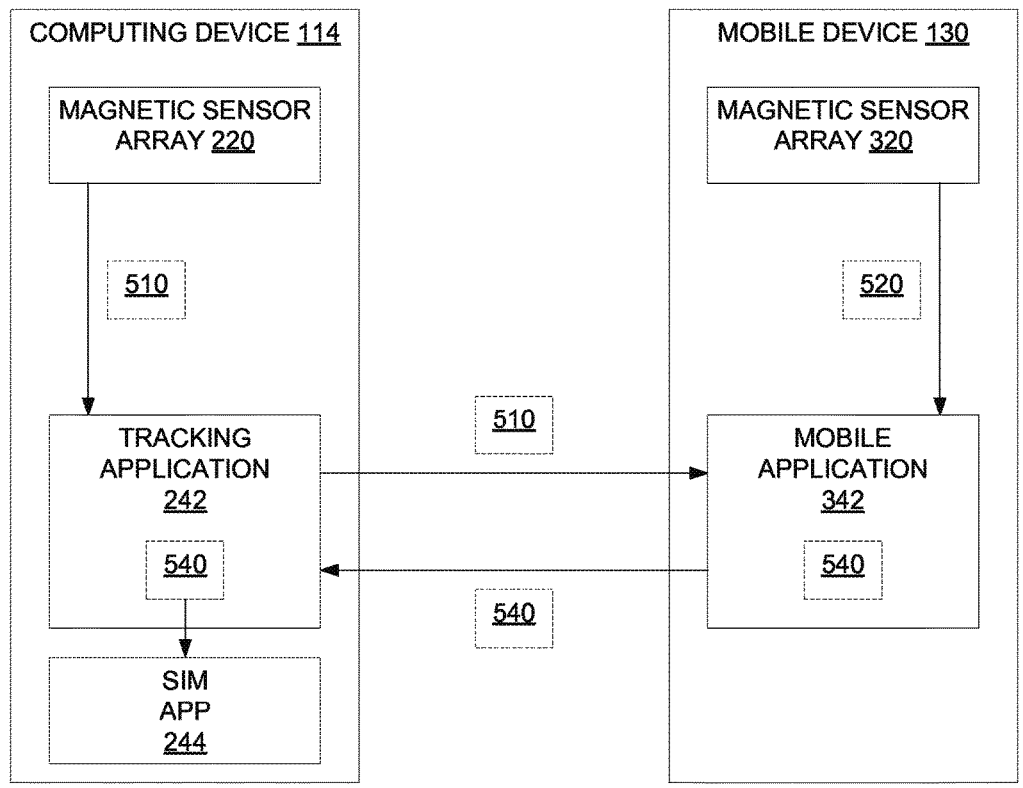
FIG. 7 is a block diagram illustrating another approach to implementing the data and processing stages of FIG. 5, according to various embodiments.

The technique described herein is generally performed by wearable device 110 and mobile device 130 in conjunction with one another. The aforesaid technique may be executed according to a wide variety of different implementations. FIGS. 6 and 7, described respectively below, set forth two exemplary implementations.

FIG. 6 is a block diagram illustrating one approach to implementing the data and processing stages of FIG. 5, according to various embodiments. As shown, magnetic sensor array 220 within computing device 114 is configured to generate head orientation data 510 and to provide that data to tracking application 242. Similarly, magnetic sensor array 320 is configured to generate mobile device orientation data 520 and to provide that data to mobile application 342. Mobile application 342 then transmits mobile device orientation data 520 to tracking application 242.

In response to receiving both head orientation data 510 and mobile device orientation data 520, tracking application 242 compares the received data and determines relative head orientation 540 of user 120. Relative head orientation 540 may then be output to simulation application 244. In the exemplary implementation described herein, tracking application 242 performs the functionality described above in conjunction with FIG. 5.

FIG. 7 is a block diagram illustrating another approach to implementing the data and processing stages of FIG. 5, according to various embodiments. As shown, magnetic sensor array 220 within computing device 114 is configured to generate head orientation data 510 and to provide that data to tracking application 242. Tracking application 242 then transmits head orientation data 510 to mobile application 342. Magnetic sensor array 320 is configured to generate mobile device orientation data 520 and to then provide that data to mobile application 342.

In response to receiving both head orientation data 510 and mobile device orientation data 520, mobile application 342 compares the received data and determines relative head orientation 540 of user 120. Mobile application 342 may then transmit relative head orientation 540 to tracking application 242. Relative head orientation 540 may then be output to simulation application 244. In the exemplary implementation described herein, mobile application 342 performs the functionality described above in conjunction with FIG. 5.

Figure 8:
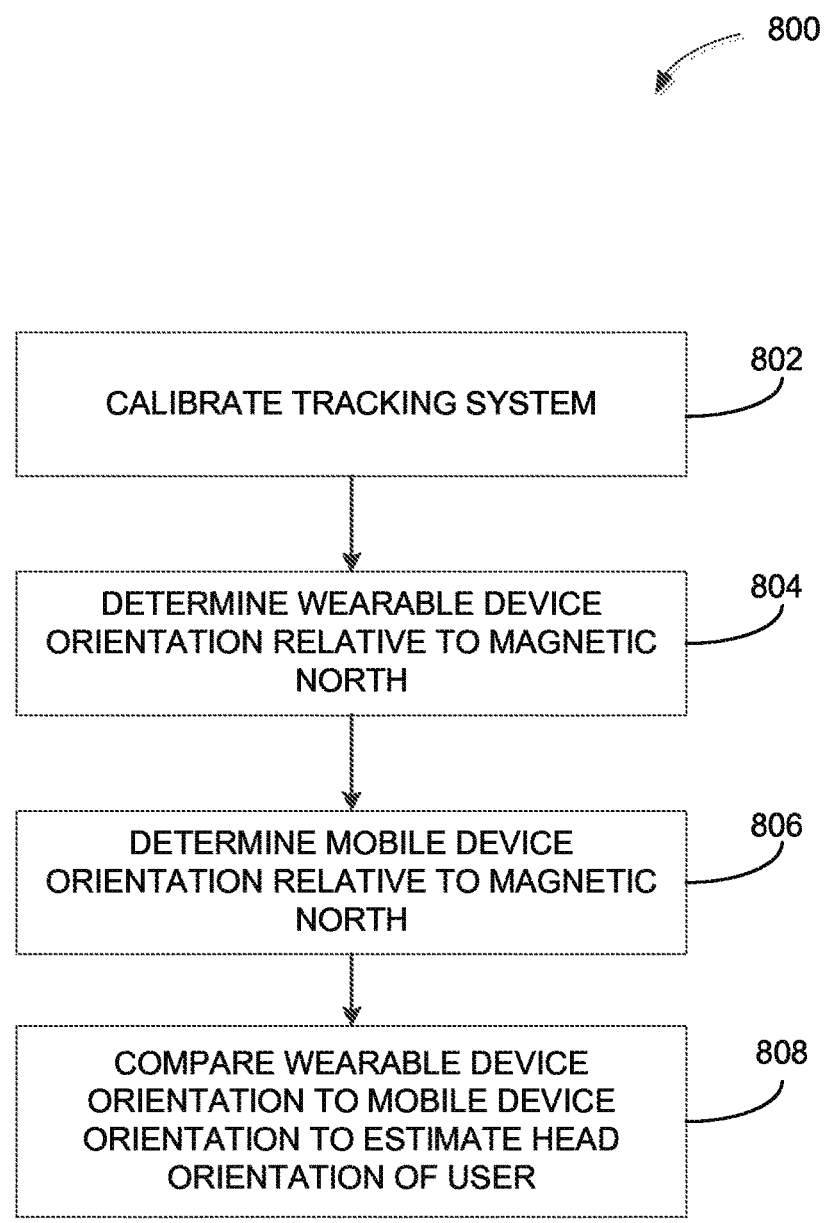
FIG. 8 is a flow diagram of method steps for determining the head orientation of a user, according to various embodiments.

FIG. 8 is a flow diagram of method steps for determining the head orientation of a user, according to various embodiments. Although the method steps are described in conjunction with the systems of FIGS. 1-7, persons skilled in the art will understand that any system configured to perform the method steps, in any order, is within the scope of the present invention.

As shown, a method 800 begins at step 802, where tracking application 242 and mobile application 342 perform a calibration routine. In doing so, tracking application 242 and mobile application 342 may initiate the processing of magnetic orientation data or exchange magnetic orientation data, among other possibilities, in order to establish a shared frame of reference. In practice, that shared reference frame is magnetic north. In one embodiment, each of tracking application 242 and mobile application 342 simply identify magnetic north, or another stable reference, in performing the calibration routine at step 802.

At step 804, tracking application 242 determines the orientation of wearable device 110 relative to magnetic north. Tracking application 242 may perform step 804 based on magnetic orientation data provided by magnetic sensor array 220. In one embodiment, mobile application 342 performs step 804 by receiving magnetic orientation data from wearable device 110, in the fashion described above in conjunction with FIG. 7.

At step 806, tracking application 242 determines the orientation of mobile device 130 relative to magnetic north. In doing so, tracking application 242 may receive data from mobile device 130 reflecting the orientation of that device. In one embodiment, mobile application 342 performs step 806 based on magnetic orientation data provided by magnetic sensor array 320, in the fashion described above in conjunction with FIG. 7.

At step 808, tracking application 242 computes the orientation of wearable device 110 relative to the orientation of mobile device 130 to estimate the head orientation of user 120. In doing so, tracking application 242 relies on the orientation data acquired at steps 804 and 806. In one embodiment, mobile application 342 performs step 808, in the fashion described above in conjunction with FIG. 7.

The orientation of wearable device 110 relative to the orientation of mobile device 130 generally reflects the head orientation of user 120 relative to the body of user 120, especially when the body of user 120 is substantially stationary relative to mobile device 130. The estimated head orientation computed at step 808 may be used to modify audio and/or video data presented to the user, thereby providing a potentially more realistic and immersive experience to user 120. The technique described above in conjunction with FIG. 8 may also be practiced in coordination with another technique, described below in conjunction with FIG. 9.

Figure 9:
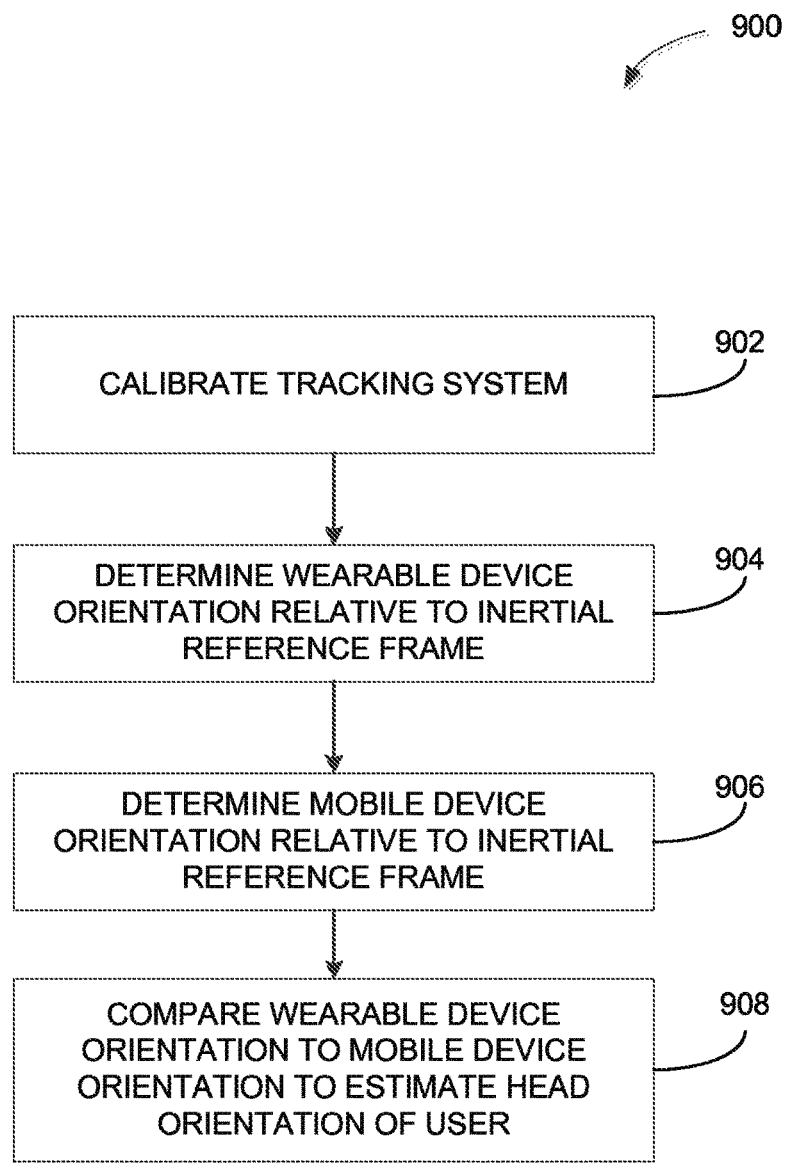
FIG. 9 is a flow diagram of method steps for determining the head orientation of a user, according to various other embodiments.

FIG. 9 is a flow diagram of method steps for determining the head orientation of a user, according to various other embodiments. Although the method steps are described in conjunction with the systems of FIGS. 1-7, persons skilled in the art will understand that any system configured to perform the method steps, in any order, is within the scope of the present invention.

As shown, a method 900 begins at step 902, where tracking application 242 and mobile application 342 perform a calibration routine. In doing so, tracking application 242 and mobile application 342 may initiate the processing of inertial orientation data or exchange inertial orientation data, among other possibilities, in order to establish a shared inertial reference frame.

At step 904, tracking application 242 determines the orientation of wearable device 110 relative to the shared inertial reference frame. Tracking application 242 may perform step 804 based on inertial orientation data provided by inertial sensor array 320. In one embodiment, mobile application 342 performs step 904 by receiving inertial orientation data from wearable device 110.

At step 906, tracking application 242 determines the orientation of mobile device 130 relative to the shared inertial reference frame. In doing so, tracking application 242 may receive data from mobile device 130 reflecting the orientation of that device. In one embodiment, mobile application 342 performs step 906 based on inertial orientation data provided by inertial sensor array 320.

At step 908, tracking application 242 computes the orientation of wearable device 110 relative to the orientation of mobile device 130 to estimate the head orientation of user 120. In doing so, tracking application 242 relies on the orientation data acquired at steps 904 and 906. In one embodiment, mobile application 342 performs step 908, in the fashion described above in conjunction with FIG. 7.

The orientation of wearable device 110 relative to the orientation of mobile device 130 generally reflects the head orientation of user 120 relative to the body of user 120, especially when the body of user 120 is substantially stationary relative to mobile device 130. The estimated head orientation computed at step 908 may be used to modify audio and/or video data presented to the user, thereby providing a potentially more realistic and immersive experience to user 120. In various embodiments, the technique described above in conjunction with FIG. 9 may be practiced concurrently with the technique described above in conjunction with FIG. 8, thereby enabling the head orientation of user 120 to be determined based on both magnetic orientation data as well as inertial orientation data. For example, the method 800 may be performed to determine a yaw angle associated with the head of user 120, while the method 900 may be performed to determine a pitch and/or roll angle associated with the head of user 120. In certain embodiments, the magnetic orientation data may be used to apply corrections to the inertial orientation data, thereby correcting for inertial drift.

In sum, a wearable device worn on the head of a user determines the head orientation of the user. A tracking application executing on the wearable device determines the orientation of the wearable device relative to a frame of reference. A mobile application executing on a mobile device likewise determines the orientation of the mobile device relative to the frame of reference. The frame of reference may be magnetic north or an inertial reference frame shared between the wearable device and the mobile device. The tracking application estimates the head orientation of the user, relative to the mobile device, based on the relative orientations of the wearable device and the mobile device.

At least one advantage of the disclosed embodiments is that the head orientation of the user may be determined using passive components, without substantial reliance on power-hungry active components. Since the wearable device and the mobile device are capable of detecting magnetic north, these instruments may orient themselves without the need for complex hardware. Accordingly, the orientations of these devices relative to magnetic north may be determined with relative ease, and then simply compared with one another to determine the head orientation of the user. Another advantage is that inertial forces applied to the wearable device and the mobile device may not disrupt the orientation of these devices, since those computations depend on the measurement of magnetic north alone. Consequently, the head orientation of the user may be determined in the presence of outside forces, including the acceleration of an inertial reference frame where the user resides.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable medium storing program instructions that, when executed by a processor, cause the processor to determine an orientation of a head of a user relative to a body of the user, by performing the steps of:
   determining a first orientation of a first device relative to a shared spatial reference frame, wherein the first device is worn on the head of the user;
   determining a second orientation of a second device relative to the shared spatial reference frame, wherein the second device is stationary relative to the body of the user, but is not stationary relative to the head of the user; and
   comparing the first orientation to the second orientation to determine a relative orientation between the first device and the second device, wherein the relative orientation reflects the orientation of the head of the user relative to the body of the user.

2. The non-transitory computer-readable medium of claim 1, wherein the shared spatial reference frame comprises magnetic north.

3. The non-transitory computer-readable medium of claim 2, further comprising the steps of performing at least a portion of a calibration routine to identify a direction associated with magnetic north.

4. The non-transitory computer-readable medium of claim 1, wherein the shared spatial reference frame comprises an inertial reference frame.

5. The non-transitory computer-readable medium of claim 4, further comprising the steps of performing at least a portion of a calibration routine to identify an origin associated with the inertial reference frame.

6. The non-transitory computer-readable medium of claim 1, wherein comparing the first orientation to the second orientation comprises subtracting a second angle associated with the second orientation from a first angle associated with the first orientation.

7. A system configured to determine an orientation of a head of a user relative to a body of the user, comprising:
   a first device, including:
      a first sensor array configured to determine a first orientation of the first device relative to a shared spatial reference frame, wherein the first device is worn on the head of the user,
      a first memory configured to store a first software application, and
      a first processor configured to execute the first software application, wherein the first processor, in conjunction with executing the first software application, compares the first orientation to a second orientation of a second device relative to the shared spatial reference frame to determine a relative orientation between the first device and the second device, wherein the second device is stationary relative to the body of the user, but is not stationary relative to the head of the user, and the relative orientation reflects the orientation of the head of the user relative to the body of the user.

8. The system of claim 7, further comprising:
   the second device, coupled to the first device, and including:
      a second sensor array configured to determine the second orientation of the second device relative to the shared spatial reference frame,
      a second memory configured to store a second software application, and
      a second processor configured to execute the second software application,
      wherein the first processor, in conjunction with executing the first software application, interoperates with the second processor, in conjunction with executing the second software application, to compare the first orientation to the second orientation to determine the relative orientation between the first device and the second device.

9. The system of claim 8, wherein the first device comprises a wearable device coupled the head of the user, and the second device comprises a mobile device associated with the body of the user.

10. The system of claim 8, wherein the first processor, in conjunction with executing the first software application, is configured to:
   obtain the second orientation from the second device; and
   compare the first orientation to the second orientation to determine the relative orientation between the first device and the second device.

11. The system of claim 8, wherein the second processor, in conjunction with executing the second software application, is configured to:
   obtain the first orientation from the first device;
   compare the first orientation to the second orientation to determine the relative orientation between the first device and the second device; and
   transmit the relative orientation to the first device.

12. The system of claim 8, wherein the first processor, in conjunction with executing the first software application, is configured to:
   generate a first dataset;
   modify the first dataset based on the orientation of the head of the user to produce a second dataset; and
   output the second dataset to the user.

13. The system of claim 8, wherein each of the first sensor array and the second sensor array comprises a magnetic sensor array, and wherein the shared spatial reference frame comprises a direction associated with magnetic north.

14. The system of claim 13, wherein the first device is further configured to perform a first calibration routine with the first sensor array to determine the direction associated with magnetic north, and wherein the second device is further configured to perform a second calibration routine with the second sensor array to determine the direction associated with magnetic north.

15. The system of claim 8, wherein each of the first sensor array and the second sensor array comprises an inertial sensor array, and wherein the shared spatial reference frame comprises an inertial reference frame.

16. The system of claim 15, wherein the first device is further configured to perform a first calibration routine with the first sensor array to determine an origin associated with the inertial reference frame, and wherein the second device is further configured to perform a second calibration routine with the second sensor array to determine the origin associated with the inertial reference frame.

17. A computer-implemented method for determining an orientation of a head of a user relative to a body of the user, the method comprising:
   determining a first orientation of a first device relative to a shared spatial reference frame, wherein the first device is worn on the head of the user;
   determining a second orientation of a second device relative to the shared spatial reference frame, wherein the second device is stationary relative to the body of the user, but is not stationary relative to the head of the user; and
   comparing the first orientation to the second orientation to determine a relative orientation between the first device and the second device, wherein the relative orientation reflects the orientation of the head of the user relative to the body of the user.

18. The computer-implemented method of claim 17, wherein the shared spatial reference frame comprises a direction associated with magnetic north, and wherein the orientation of the head of the user comprises a yaw angle.

19. The computer-implemented method of claim 17, wherein the shared spatial reference frame comprises an origin associated with an inertial reference frame, and wherein the orientation of the head of the user comprises a pitch angle or a roll angle.

20. The computer-implemented method of claim 17, further comprising:
   generating audiovisual data that reflects a virtual scene;
   modifying the audiovisual data, based on the orientation of the head of the user, to generate modified audiovisual data; and
   outputting the modified audiovisual data to the user.

21. The computer-implemented method of claim 17, wherein the first device comprises a wearable device coupled to the head of the user, and configured to determine the first orientation, determine the second orientation, and compare the first orientation to the second orientation to determine the relative orientation.

22. The computer-implemented method of claim 17, wherein the second device comprises a mobile device that is stationary relative to the body of the user and configured to determine the first orientation, determine the second orientation, and compare the first orientation to the second orientation to determine the relative orientation.

23. The non-transitory computer-readable medium of claim 1, further comprising the steps of:
   detecting a change in the orientation of the head of the user relative to the body of the user; and
   in response to the detecting, outputting different data to the user.

* * * * *